F. W. BOWER.
STAKE SOCKET.
APPLICATION FILED MAY 19, 1920.

1,365,084.

Patented Jan. 11, 1921.

Inventor
Frank W. Bower,

By Hood & Schley.
Attorneys

UNITED STATES PATENT OFFICE.

FRANK W. BOWER, OF FOWLER, INDIANA.

STAKE-SOCKET.

1,365,084.	Specification of Letters Patent.	Patented Jan. 11, 1921.

Application filed May 19, 1920. Serial No. 382,551.

*To all whom it may concern:*

Be it known that I, FRANK W. BOWER, a citizen of the United States, residing at Fowler, in the county of Benton and State of Indiana, have invented a new and useful Stake-Socket, of which the following is a specification.

It is the object of my invention to provide a stake socket for the corners of trailer frames, for receiving the stakes of side and end boards or racks, by which socket both greater strength and greater convenience are obtained.

Figure 1:
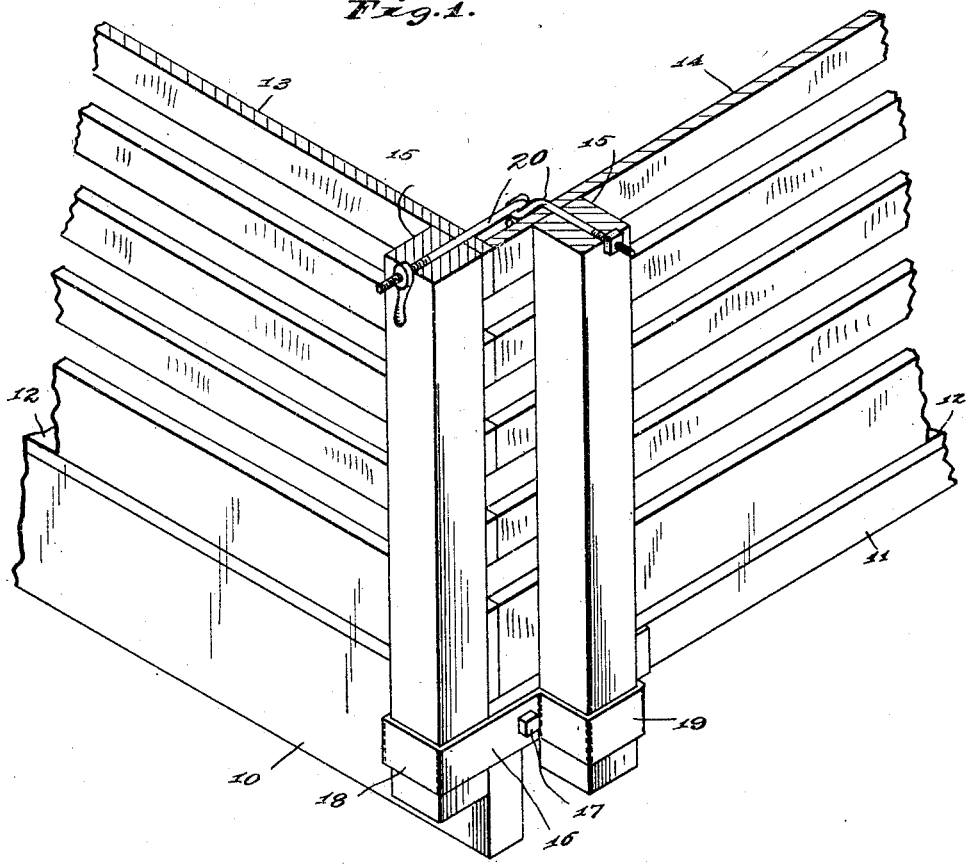
Figure 2:
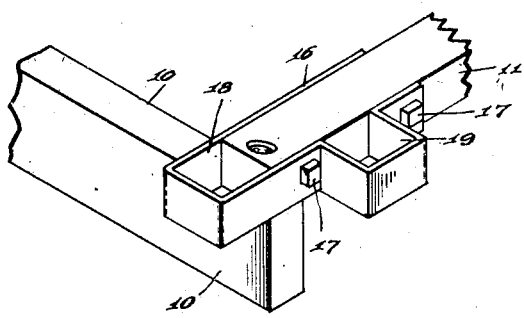
Figure 3:
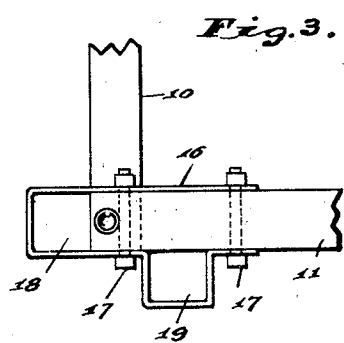

The accompanying drawing illustrates my invention: Figure 1 is a fragmentary view of a corner of a trailer frame, showing my stake socket with the stakes in place therein, and part of the associated side and end racks; Fig. 2 is a similar perspective view showing merely the longitudinal sill and the cross beam of the frame, with the stake socket; and Fig. 3 is a plan of the parts shown in perspective in Fig. 2.

The trailer frame has the usual longitudinal side sills 10, of which one is shown, and the usual cross beams 11, on which cross beams is laid the usual floor 12 (shown only in Fig. 1). This structure may be used without any side and end devices, for certain kinds of hauling, or may have removably associated with it the usual side and end boards or the usual side and end stock-racks. Fig. 1 shows the adjacent ends of one side rack 13 and one end rack 14. For the removable attachment, these side and end racks, or the side and end boards, have vertical stakes 15, which are removably insertible in suitable sockets associated with the trailer frame.

Heretofore the sockets for the side boards or side racks have usually been attached to the longitudinal sills 10, and as a result any pressure exerted outward on such side boards or side racks tends to tilt such longitudinal sills; and in addition, the sockets for the side boards and end boards or side racks and end racks have been separate, spaced some distance away from the corner formed by the meeting edges of such boards or racks, so that no mutual strengthening action was obtained.

According to my present invention, I locate the stakes 15 close to the corner formed by the meeting ends of the boards or racks 13 and 14, the stakes on the side boards or racks being right at such corners, and to provide for both of such stakes sockets formed in a single member which instead of being mounted on the longitudinal sill is mounted on the cross beam. This socket consists, preferably, of a strip of strap iron 16, which is bolted by bolts 17 to both sides of the cross beam 11. The strap-iron strip 16 projects beyond the end of the cross beam 11 and is bent on itself to form a socket 18 for the stake 17 at the end of the side 13, which socket 18 is formed by such strap and the end of the cross beam and is in the vertical plane of the cross beam. On the outer face of the cross beam 11, the strip 16 is offset outward between the two bolts 17 to form a socket 19 for the stake 15 at the adjacent end of the end rack 14. Thus the sockets 18 and 19 are both formed in the same strip of strap iron, which is carried by the cross beam 11.

As a result, if any outward pressure is exerted on the side rack 13, as may frequently happen from the lurching of the trailer, the stake 15 which fits in the socket 18 exerts tilting pressure on the cross beam 11, which because it extends completely across the trailer is much more difficult to tilt than is the longitudinal side sill 10. This makes for strength. In addition, if the side rack 13 tilts, the strap iron 16 as a whole must tilt with it, and this is resisted by the action of the stake 15 on the end rack where such stake fits in the socket 19. Similarly, if any outward pressure is exerted on the end rack 14, tending to tilt the strap iron 16, such action is resisted by the action of the stake in the socket 18. Thus there is a mutual strengthening action between the side and end frames and their stakes by reason of their mounting in sockets formed in the same piece.

In addition, by having the two stakes 15 at the corners close together, it becomes much easier to fasten them together at their upper ends, as by interlocking hooks 20. These hooks are not new of themselves, but their action is made much more effective by having the corner stakes 15 closer together and by mounting the corner stakes in sockets formed in a common member.

I claim as my invention:

1. In combination with the cross beam of a vehicle frame and the stakes of side and end boards or racks, a single socket member mounted on said cross beam and provided with two sockets for stakes of side and end boards or racks respectively.

2. In combination with the cross beam of a vehicle frame and the stakes of side and end boards or racks, a member bolted to both sides of said cross beam and providing therewith sockets at the end and at a side of said cross beam for stakes of said side and end racks or boards respectively.

3. In combination with the cross beam of a vehicle frame and the stakes of side and end boards or racks, a member bolted to both sides of said cross beam and providing therewith sockets for stakes of said side and end racks or boards.

4. In combination with the cross beam of a vehicle frame, a strap iron bent around the end of said cross beam and bolted to said cross beam by two bolts, said strap where it is bent around the end of said cross beam being spaced therefrom to form a socket and being provided on one side of said cross beam with an offset portion between said two boards for forming another socket.

5. In combination with the cross beam of a vehicle frame, a strap iron bent around the end of said cross beam and bolted to said cross beam, said strap where it is bent around the end of said cross beam being spaced therefrom to form a socket.

In witness whereof, I have hereunto set my hand at Fowler, Indiana, this 8th day of May, A. D. one thousand nine hundred and twenty.

FRANK W. BOWER.